Feb. 27, 1934.  H. C. LAUFE  1,948,987
SHAVING RECEPTACLE
Filed Sept. 26, 1932
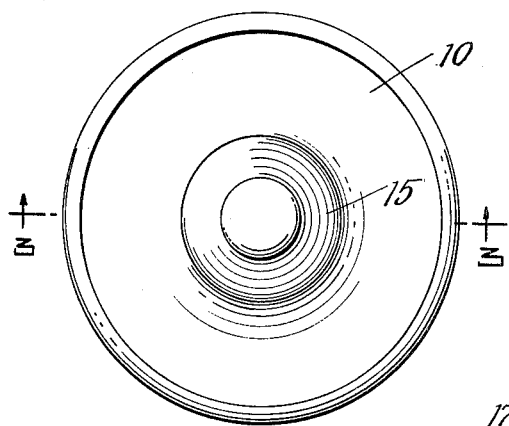
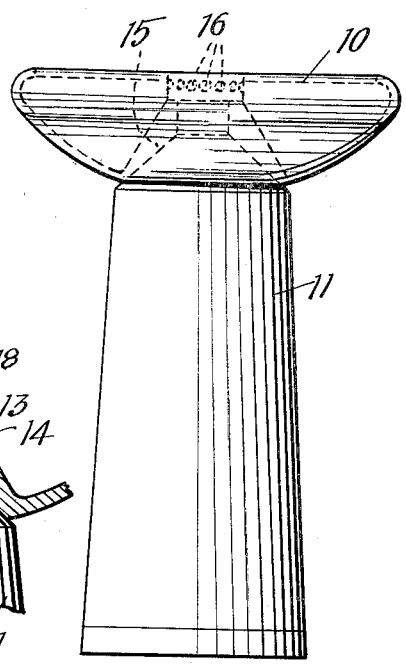
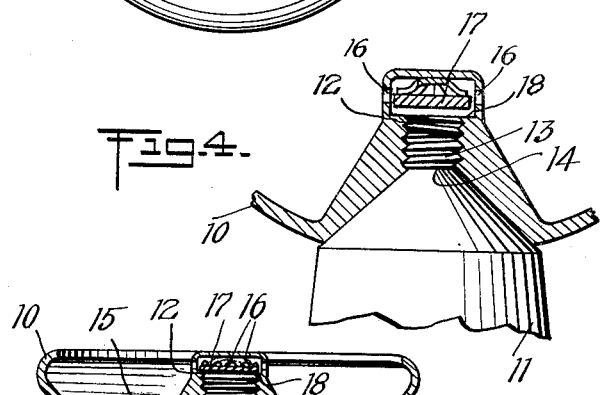
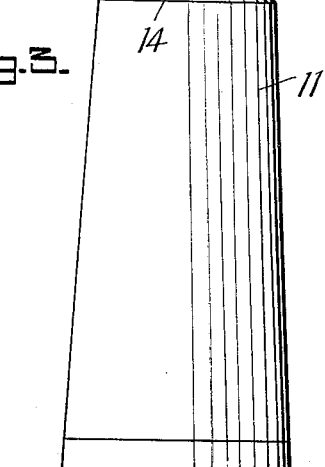
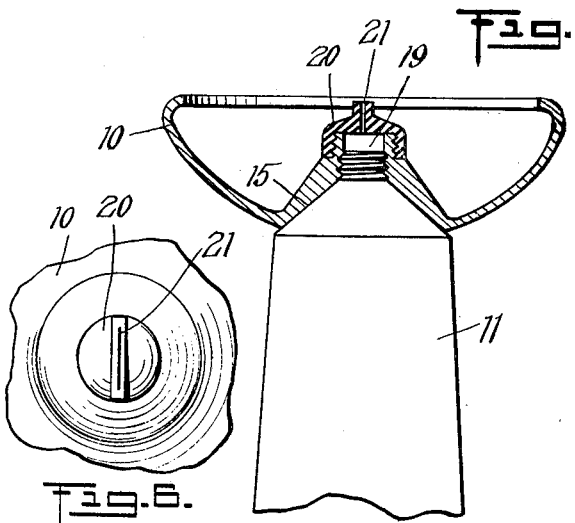
INVENTOR
Henry C. Laufe
BY
ATTORNEY Patented Feb. 27, 1934

1,948,987

UNITED STATES PATENT OFFICE 1,948,987

SHAVING RECEPTACLE

Henry Charles Laufe, Bogota, N. J.

Application September 26, 1932
Serial No. 634,869

3 Claims. (Cl. 45—136)

This invention relates to receptacles for shaving, and more particularly to that type of receptacle used for mixing purposes, for instance, as a shaving cup or lather receptacle, and is an improvement on my application, Serial No. 417,568 filed December 30, 1929.

Among the principal objects which the present invention has in view are: To provide a combination container stand and mixing chamber; to provide automatic means to release the cream under pressure; to provide means in the receptacle which will permit an even flow of cream to pass therein; to prevent overflow of the cream into the receptacle when not in use; to dispense cream under pressure into the receptacle in measured quantities; to mount the tube so its contents will discharge into the receptacle to be mixed; to keep the contents sealed; to secure simplicity of construction and operation; and to obtain other advantages and results as may be brought out in the following description.

Drawing:

Figure 1 is a plan of my improved receptacle;

Figure 2 is a front elevation of the same;

Figure 3 is a longitudinal sectional view shown as taken on the line 3—3 of Figure 1, within which is held a tube of cream;

Figure 4 is a similar view on enlarged scale;

Figure 5 is a modified form of receptacle and tube, varying slightly from Figure 2; and Figure 6 is a top plan, partly broken away.

Description:

As seen in the drawing, and referring to Figures 1 to 4 inclusive, the reference numeral 10 indicates a cup-like bowl or container for the reception of cream from a collapsible tube 11, said container having means for attaching the tube thereto. Said attaching means preferably is an inwardly projecting neck 12 from the bottom of the container which provides a chamber longitudinally of said neck preferably having internal threads 13 whereby the threaded nipple 14 of the tube may be held snugly to the container 10. It is to be noted that the container may be constructed of a durable material, such as metal or the like and may be manufactured cheaply so as to be sold at a low price. Also, it is preferable that the tube may be replaced with a new one from time to time as desired without injury to the container.

The threaded nipple 14 of the tube 11 as shown, extends only part way up in the neck 12 of the container being prevented from extending further by an interior shoulder 15 formed in the neck chamber, against which the tapered shoulder of the tube abuts, when applied. This shoulder 15 likewise insures a snug fit of the tube in the container.

It is to be noted the neck 12, as here shown, is entirely closed at its upper end and is preferably integral with the container 10. Adjacent its upper end, and in order that the flow of cream from the tube may be limited as well as evenly distributed, the neck is provided with a plurality of openings or holes 16, arranged in uniform relationship to each other. However, said holes 16 are preferably of a small diameter so as to prevent more than the desired amount of cream to pass therethrough when ordinary pressure is applied in squeezing or rolling the tube for dispensing the cream.

To further insure a limited amount of cream to escape under pressure, I have provided means within the neck perforation 12 which will automatically shut down the flow of cream when a sufficient or measured quantity has passed through the holes 16. Said means in the present instance may be in the form of a metal disk 17 substantially the same diameter as the chamber. This metal disk may act as a check valve, and preferably rests on a shoulder 18 formed by the internal threads 13 of the neck.

To further insure sealing the disk against the shoulder 18, I provide means in the form of a spider spring 19 as shown in Figure 4.

In operation when pressure is applied to the tube of cream, the cream will be caused to move upwardly towards the underside of the disk 17, thereby pushing the disk slightly upward against the downward pressure of the spring 19. The disk will remain in this position until the pressure is released from the tube and the flow of cream has subsided. When said disk is in this position the cream will escape along the outer periphery of the disk and adjacent the inner side of the neck and pass out through the holes 16 and there permitted to be mixed into a lather in the container 10. As the cream is removed and the pressure released from the tube, the disk 17 will then resume its normal position against the shoulder 18 under influence of the spring 19. It is to be noted that when the disk is in this position, no water or mixture can seep through to injure the remaining contents of the tube.

It is further to be noted that during the above operation, the receptacle may be conveniently supported by utilizing the tube as a handle in a manner not applying pressure thereto as will be readily appreciated. After use, the container can be easily and thoroughly cleaned. Since the rim of the container is preferably in a plane or flat, said container can be inverted with said rim downward for resting on a shelf or other surface with the tube in an inverted upright position.

As seen in Figures 5 and 6, I have shown a slightly modified form for dispensing the cream from the tube under pressure. In this respect, I utilize a similar container 10 having an interior shoulder 15 formed in a tapped neck perforation 19. The upper outer end of said tapped neck perforation is reduced in diameter to receive a nipple 20 thereon. Said nipple is preferably constructed of a pliable material which in this instance may be of rubber and is securely attached to the reduced portion of the neck as by being screwed thereon or otherwise permanently attached.

When pressure is applied to the tube, cream is ejected upwardly against the inner surface of the nipple 20. In order that the cream can be discharged, I have provided a slit 21 in the nipple which is normally closed but will expand sufficiently to pass the cream therethrough while under pressure. When a required amount of cream has been ejected, pressure against the tube is released after which the slit returns to normal or closed condition.

While I have herein described the device as preferably used in connection with shaving cream and as a shaving receptacle, I do not wish to be understood as limiting myself to such use or employment, as it may be used in conjunction with collapsible tubes of tube paste or other similar material and for other uses and employments, all of which I consider to be within the scope of the following claims.

I claim:

1. A device as characterized comprising a bowl, a neck integral with said bowl, said neck providing a chamber and having means for receiving and attaching the nipple of a tube of cream to said bowl, a disk in said chamber and resting against the bottom of the chamber in normal position, said neck having a plurality of holes above the disk to permit passage of cream under pressure from said tube to said bowl by lifting said disk clear of the holes whereby a measured quantity of cream will be extruded into the bowl, and other means in said chamber and above the disk for returning the disk to normal position as pressure is released from the tube.

2. A device as characterized comprising a bowl, a neck, integral with said bowl, said neck providing a chamber and having means for receiving and attaching the nipple of a tube of cream to said bowl, a disk in said chamber and resting against the bottom of the chamber in normal position, said neck having a plurality of holes above the disk to permit passage of cream under pressure from said tube to said bowl by lifting said disk clear of the holes whereby a measured quantity of cream will be extruded into the bowl, a spring in said chamber and above the disk for returning the disk to normal position as pressure is released from the tube.

3. A device as characterized comprising a bowl, a neck integral with said bowl, said neck providing a chamber and having means for receiving and attaching the nipple of a tube of cream to said bowl, a shoulder in said chamber and above said means adapted to receive a disk of smaller diameter than the chamber to rest thereon in normal position, said neck having a plurality of holes extending through from the chamber to the bowl to permit passage of cream under pressure to pass around the outer periphery of said disk from said tube, to said bowl by lifting the disk whereby a measured quantity of cream will be extruded into the bowl, and a spring in said chamber and above the disk for returning said disk to its normal position on said shoulder as pressure is released from the tube.

HENRY CHARLES LAUFE.